Sept. 25, 1928.
O. S. HERSHEY
AUTOMOBILE LOCK
Filed Dec. 18, 1926   2 Sheets-Sheet 1
1,685,128
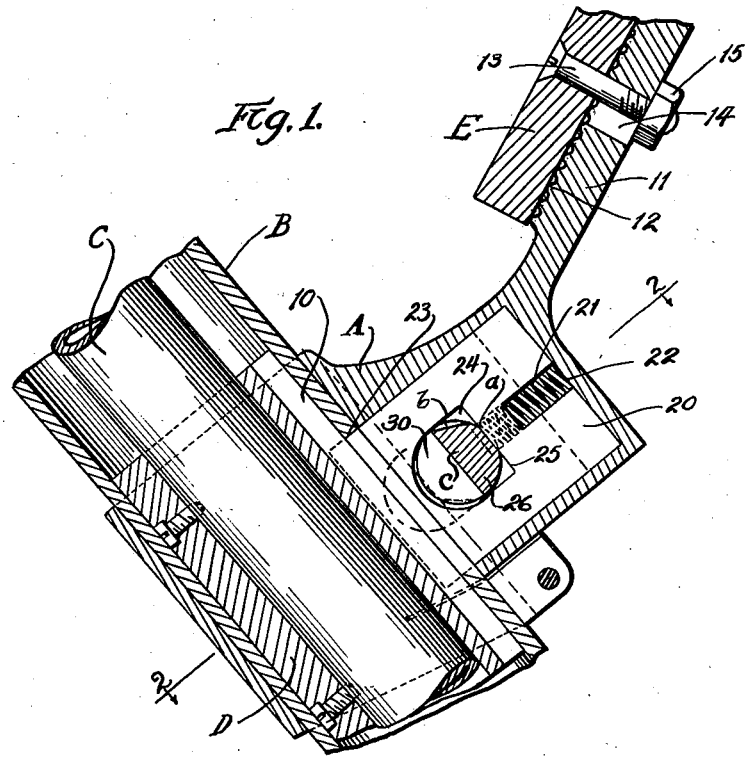
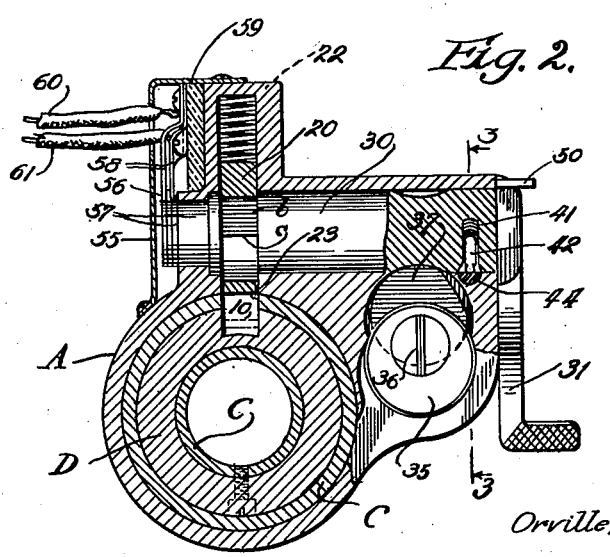
Inventor
Orville S. Hershey Sept. 25, 1928.

O. S. HERSHEY 1,685,128

AUTOMOBILE LOCK

Filed Dec. 18, 1926

INVENTOR
Orville S. Hershey
BY
ATTORNEY

Patented Sept. 25, 1928.

1,685,128

UNITED STATES PATENT OFFICE.

ORVILLE S. HERSHEY, OF CHICAGO, ILLINOIS, ASSIGNOR TO HERSHEY MANUFACTURING COMPANY, OF CHICAGO, ILLINOIS, A CORPORATION OF COLORADO.

AUTOMOBILE LOCK.

Original application filed April 13, 1922, Serial No. 552,357. Divided and this application filed December 18, 1926. Serial No. 155,619.

This invention relates to certain improvements in automobile locks, and more particularly to locks of the coincidental type which combine in a unitary structure a detent or locking bolt and an electrical switch, together with a single operating means therefor, such as has been shown and described in my prior application Serial No. 552,357, filed April 13, 1922, of which this is a divisional case.

It is a primary object of my invention to provide a lock of simple, practical and efficient construction which may be contained within a housing that surrounds the steering column of an automobile, and, if desired, be secured to a fixed part thereof, such as the dash board; to provide therefor an operating means which may be optionally manipulated to affect either the detent and switch, or just the latter alone; and to so construct and arrange the switch unit that it may be associated with or disassociated from the remainder of the lock structure without requiring access to any of the parts interiorly thereof.

Other objects as well will hereinafter appear from the description and claims to follow, and from the accompanying drawing wherein is set forth a suggestive embodiment of this invention in the manner following:

Figure 1 is a central longitudinal section through the lock and housing therefor;

Fig. 2 is a transverse section on line 2—2 of Fig. 1;

Figure 3:
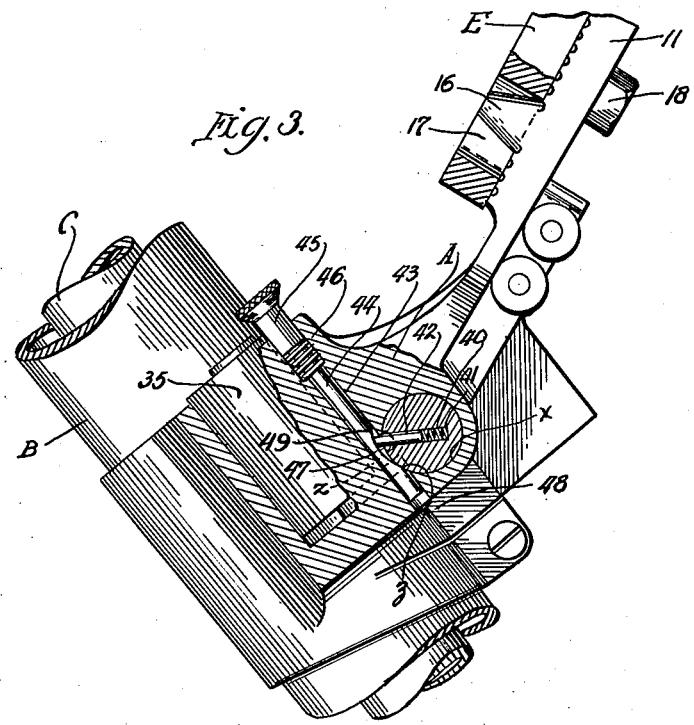
Figure 4:
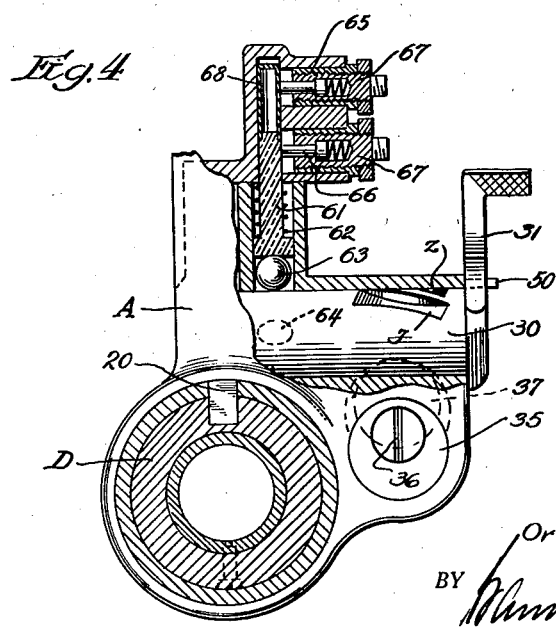

Fig. 3 which is a longitudinal section on line 3—3 of Fig. 2, shows a modification in the construction of the bracket plate which connects the lock to the instrument board; and Fig. 4 is a plan view with portions broken away to exhibit a modification of the ignition switch.

The lock shown in Figs. 1 and 2 is contained within a housing A adapted for mounting upon the column B which surrounds in spaced relation an automobile steering post C, here represented as a tube. In the region of the lock is a collar D secured fast to the post, there being a longitudinal groove 10 formed in the collar. Since the collar is associated with the post primarily to facilitate construction, and is to all intents and purposes a part thereof, it will be so treated in the description and claims to follow.

If the present lock be designed for additional connection to the automobile dash or instrument board E, it is preferably formed with an upwardly extending plate 11 serrated as at 12 or otherwise appropriately formed on its face which engages with the rear side of the dash. Connecting the lock to the board are bolts 13 each passing through an aperture in the dash and through a slot 14 in the plate for permitting the device to be vertically adjusted upon the dash board, thereby varying within certain limits the angular position of the steering column. A nut 15 threaded onto each bolt bears with pressure against the rear side of the plate which tends to remain in a given position of adjustment relative to the dash, due, in part, to the serrations 12.

A slightly different connection between the lock housing and dash board is illustrated in Fig. 3 wherein the plate 11 is provided additionally with a boss 16 adapted to extend into a slot 17 formed through the dash, thereby resisting any tendency toward lateral shifting movement. Bolts or screws 18 for providing additional connection may also be used, as indicated in this figure.

The mechanism contained within the housing by which the steering post may be locked against rotation comprises parts as follows: Within a chamber which extends rearwardly from the column is slidably mounted a locking bolt 20 having an open slot 21 at its rear end in which is seated a compression spring 22 that tends to urge the bolt forward through an opening 23 in the column so as to lodge within the collar groove 10. Unless otherwise restrained, the locking bolt will, therefore, assume the position indicated by the dotted lines in Fig. 1. For controlling the movements of the locking bolt I provide in its body an aperture 24 the rear side of which is flat, and disposed therewithin is an eccentric 26 having two angularly related flat faces $a$ and $b$ and also a third flat face $c$ which is aligned substantially diametrically with the axis of a rock shaft 30 on which the eccentric is formed. This rock shaft is journaled within an opening extending transversely through the housing rearwardly of the column, one end of the shaft being provided with an operating handle 31 which lies exteriorly of the lock.

Referring now to Figs. 2 and 3, there is arranged within the housing a rotatable cylinder lock 35 having an entry slit 36 disposed upon the upper side of the housing for the reception of an operating key. The lock cylinder extends within the housing close to the rock shaft, and at its inner end is provided with an eccentric lug 37 adapted when in one position to engage within one of three longitudinal grooves $x$, $y$ and $z$ that are formed in the rock shaft. The circumferential relation of these grooves corresponds with that of the eccentric faces $a$, $b$ and $c$ so that the spring 22 acting through the bolt 20 will tend to hold the shaft in any one of the three positions wherein the lug 37 may enter one of the grooves $x$, $y$ and $z$ to thereby lock the shaft against further rotation until resort is had to the operating key to rotate the cylinder lock in the reverse direction necessary for disengagement of the eccentric lug.

Extending transversely into the rock shaft is a bore 40 wherein is accommodated a push spring 41 that bears against a plunger 42 to press the same outwardly against the surrounding walls. The open end of the bore lies adjacent one end of the groove $z$ and is disposed in the plane of an intersecting tangential bore 43 wherein is slidably mounted a safety pin 44 having a head 45 which projects exteriorly of the housing. A spring 46 which bears outwardly against the head tends to hold the safety pin in an outer position. In the body of the pin is provided a longitudinally curved notch 47, the contour of which about corresponds to the periphery of the rock shaft 30. When the safety pin is pushed in to its limit which may be determined by engagement of its inner end with the bottom 48 of the bore, the notch 47 will coincide with the periphery of the rock shaft; whereas in its normal position (see Fig. 3), the pin will engage the rock shaft in the region of the lower notch end.

Of more importance, however, is the relationship to the safety pin of the plunger 42 which engages therewith whenever the rock shaft is so disposed that either of the eccentric faces $a$ or $b$ are engaged by the bolt 20. From Fig. 3 it will be noted that the plunger end protrudes from the bore 40 so as to engage with the corner 49 which is formed by the intersection of the bore with the opening wherein is accommodated the rock shaft. The rock shaft will accordingly be prevented from rotation in a clockwise direction. If, however, the safety pin be shoved in, its curved notch surface 47 will act as a cam to force the plunger back to a position where it lies wholly within the rock shaft, thereby permitting the same to be rotated. In the position shown in Fig. 3, the rock shaft is also held by the eccentric lug of the cylinder lock from rotating in either direction.

To permit operation of the steering mechanism, the locking bolt is retracted, as indicated in Fig. 1, to what will be termed first position. Here it will be noted the eccentric face $a$ is engaged with the locking bolt. Additionally I provide a stop means in the form of a pin 50 which engages with the hands 31 when the rock shaft has been rotated through its intended arc—about 180° altogether. In this first position the eccentric 37 may be moved into notch $x$ to maintain the parts against change in relation. A second or intermediate position is reached when face $b$ of the eccentric is presented to the locking bolt. In shifting to this position the plunger 42 comes into engagement with the corner 49 to prevent further movement without which the steering post cannot be locked. In the second position the eccentric lug 37 may also be relied upon to hold the parts immovable. The third position requires a rotation of the rock shaft from first position through about 180° to present the eccentric face $c$ to the locking bolt which is then permitted to move forward into engagement with the groove 10 to lock the steering post. The plunger 42 in this position is turned away from the safety pin so as to have no active function.

In connection with a steering lock of the kind described, an ignition lock may also be provided. Two suggested constructions are shown in Figs. 2 and 4. In the former a switch is provided at the end of the rock shaft opposite the operating handle 31, the whole being housed within a case 55 that is removably secured to the lock housing.

As shown, the switch comprises an eccentric tongue 56 mounted upon one end of the rock shaft between appropriate insulating disks 57. The tongue is adapted for movement between fingers 58 having a mounting on an insulation block 59 which is affixed to the lock housing upon an outer side thereof. Wires 60 and 61 connect with the fingers and form part of the engine ignition circuit. The tongue occupies a rotative position upon the rock shaft such as to lie between the fingers 58 only when the parts are in first position. In the second and third positions the tongue is disengaged from the fingers so as to break the ignition circuit. By combining a switch of this character with the steering lock of this invention, I provide for operation of the steering mechanism and ignition system when the parts are in first or running position; in the second position the ignition only is disabled; whereas in the third position both the steering and ignition are rendered inoperative.

An ignition switch of somewhat altered construction is shown in Fig. 4, wherein the lock housing is formed to provide a chamber for the accommodation of an insulated slidable plunger 61 one end of which is pressed by a spring 62 against a ball 63 that rests upon the periphery of the rock shaft. A socket 64 formed in the shaft is adapted to partly receive the ball when the parts are in the first position, the ball, together with its associated parts, constituting in effect a friction detent in relation to the rock shaft. Bearing laterally against the plunger are two pins 65 and 66 held in suitable insulating mountings 67, each being spring pressed against the plunger. The pin mountings are preferably carried in a switch housing 69 which is removably affixed to the lock structure in any convenient manner. Capping one end of the plunger is a conductor sleeve 68 that extends from the pin 65 close to the pin 66 which latter bears against the insulated body of the plunger when the parts are in the position shown in Fig. 4. If the rock shaft be rotated, however, to the second or third positions wherein the ball 63 is expelled from the socket 64, the plunger will shift endwise sufficiently to move the conductor sleeve out of contact with the proximate end of the pin 66, thereby breaking an electrical circuit between the two pins. Suitable insulated conductors, not shown, extend from the pins to provide an electrical circuit for the ignition system of the engine in a manner that is well understood.

The device forming the present invention provides a lock for the steering mechanism and, associated therewith, a switch for the ignition system of an automobile engine. In using the term "ignition system", I wish to be understood as referring to any electrically controlled automobile mechanism, the operation of which is necessary to free use of the car. The coincidental lock of this invention is under the control of a single means. In addition, the switch which forms an ignition lock may derive either a circular or linear movement from the steering lock control. In addition, movement of the rock shaft is controlled by a key operated lock, and may also require operation of a safety pin which must be shifted as a step preliminary to rotation of the rock shaft from its locking positions. The switch unit is also convenient for assembly with the locking mechanism, in that it may be attached to the housing therefor, or be detachable therefrom, without disturbing or affecting the operative relation of the lock parts interiorly of the housing. Features such as these which characterize my invention, are embodied in a structure which is practicable to manufacture and install, and which will be found durable in service.

I claim:

In combination, a lock having a housing in which is contained a bolt and operating means therefor, an electrical switch including a pair of fixed contacts, a movable switch element adapted to make or break an electrical connection between said contacts, a connection between the bolt operating means and the movable switch element such that the latter is actuated in response to movements of the former, and spring means working through the movable switch element providing a friction detent for the bolt operating means, substantially as described.

ORVILLE S. HERSHEY.